(12) United States Patent
Donahue, III (10) Patent No.: US 12,111,860 B1
(45) Date of Patent: Oct. 8, 2024

(54) PATENT APPLICATION PREPARATION SYSTEM AND TEMPLATE CREATOR

(71) Applicant: Dennis J M Donahue, III, St. Louis, MO (US)

(72) Inventor: Dennis J M Donahue, III, St. Louis, MO (US)

( * ) Notice: Subject to any disclaimer, the term of this patent is extended or adjusted under 35 U.S.C. 154(b) by 5 days.

(21) Appl. No.: 17/752,404

(22) Filed: May 24, 2022

Related U.S. Application Data (63) Continuation-in-part of application No. 16/211,198, filed on Dec. 5, 2018, now Pat. No. 11,341,323.

(60) Provisional application No. 62/595,581, filed on Dec. 6, 2017.

(51) Int. Cl.
  G06F 16/35 (2019.01)
  G06F 40/205 (2020.01)
  G06F 40/40 (2020.01)

(52) U.S. Cl.
  CPC .......... *G06F 16/353* (2019.01); *G06F 40/205* (2020.01); *G06F 40/40* (2020.01)

(58) Field of Classification Search
  CPC ....... G06F 16/353; G06F 40/40; G06F 40/205
  See application file for complete search history.

(56) References Cited

U.S. PATENT DOCUMENTS

| | | | | |
|---|---|---|---|---|
| 5,754,939 A * | 5/1998 | Herz | ............... | H04N 21/4622 348/E7.071 |
| 5,915,001 A * | 6/1999 | Uppaluru | ............ | H04L 67/02 704/270.1 |
| 6,047,327 A * | 4/2000 | Tso | ............... | G06F 16/958 709/219 |
| 6,269,369 B1 * | 7/2001 | Robertson | ............ | G06Q 10/025 |
| 6,459,913 B2 * | 10/2002 | Cloutier | ............... | H04W 4/12 379/211.01 |

(Continued)

OTHER PUBLICATIONS

Cascini G., Fantechi A., Spinicci E. (2004). Natural Language Processing of Patents and Technical Documentation. In: Marinai, S., Dengel, A.R. (eds) Document Analysis Systems VI. DAS 2004. Lecture Notes in Computer Science, vol. 3163. Springer, Berlin, Heidelberg.

(Continued)

*Primary Examiner* — Nicholas Augustine
(74) *Attorney, Agent, or Firm* — CreatiVenture Law, LLC; Dennis J M Donahue, III (57) ABSTRACT

The invention is a patent application preparation system that automatically creates a template application based on a claim set. A natural language processor transforms the claim language into prose and automatically adds reference numbers to the claim elements in the prose. The claim set can be provided in a record of invention form with additional technical information about the prior art and the technical subject matter. Additionally, the natural language processor can work in combination with a parsing routine and document integration program to combine the prose with the existing prose of a baseline document. The preparation system also has an image processing tool that automatically identifies features in illustrations that correspond to the claim elements. The preparation system produces a database of reference numbers that uniquely correlate to the claim elements and other technical terms, and an editing tool automatically adds the reference numbers to the illustrations.

20 Claims, 5 Drawing Sheets

(56) References Cited

U.S. PATENT DOCUMENTS

| | | | |
|---|---|---|---|
| 6,501,832 B1* | 12/2002 | Saylor | H04M 3/4938 |
| | | | 379/88.19 |
| 7,127,232 B2* | 10/2006 | O'Neil | G06Q 30/04 |
| | | | 705/40 |
| 7,133,869 B2* | 11/2006 | Bryan | H04L 67/55 |
| | | | 707/999.102 |
| 7,143,118 B2* | 11/2006 | Eichstaedt | H04N 21/41407 |
| | | | 715/255 |
| 7,333,967 B1 | 2/2008 | Bringsjord et al. | |
| 7,930,169 B2 | 4/2011 | Billerey-Mosier | |
| 8,065,313 B2 | 11/2011 | Yagnik | |
| 8,180,629 B2 | 5/2012 | Rehberg | |
| 8,612,853 B2 | 12/2013 | Milton et al. | |
| 9,973,705 B2 | 5/2018 | Ko et al. | |
| 10,469,755 B2 | 11/2019 | Badr et al. | |
| 11,232,258 B2 | 1/2022 | Andrews et al. | |
| 11,301,640 B2 | 4/2022 | Sankaran et al. | |
| 2002/0042846 A1* | 4/2002 | Bottan | H04L 67/04 |
| | | | 709/227 |
| 2002/0065884 A1* | 5/2002 | Donoho | H04L 9/40 |
| | | | 709/224 |
| 2002/0087740 A1* | 7/2002 | Castanho | G06Q 10/107 |
| | | | 719/318 |
| 2002/0090934 A1* | 7/2002 | Mitchelmore | H04L 41/5054 |
| | | | 455/412.2 |
| 2003/0110262 A1* | 6/2003 | Hasan | H04L 67/51 |
| | | | 709/226 |
| 2003/0131073 A1* | 7/2003 | Lucovsky | G06F 21/6245 |
| | | | 709/219 |
| 2003/0225683 A1* | 12/2003 | Hill | G06Q 10/06 |
| | | | 705/37 |
| 2004/0002972 A1* | 1/2004 | Pather | G06F 9/542 |
| 2004/0078464 A1* | 4/2004 | Rajan | G06Q 30/02 |
| | | | 709/224 |
| 2005/0027741 A1* | 2/2005 | Eichstaedt | G06F 9/542 |
| 2005/0144266 A1* | 6/2005 | Antonelli | H04L 67/55 |
| | | | 709/223 |
| 2008/0162308 A1* | 7/2008 | Sharma | G06Q 10/087 |
| | | | 705/28 |
| 2011/0182493 A1 | 7/2011 | Huber et al. | |
| 2013/0080883 A1 | 3/2013 | Narasani | |
| 2013/0198092 A1 | 8/2013 | Dugan et al. | |
| 2013/0282735 A1* | 10/2013 | Pedersen | G06F 16/3323 |
| | | | 707/748 |
| 2014/0075004 A1* | 3/2014 | Van Dusen | G07C 13/00 |
| | | | 709/223 |
| 2016/0048936 A1* | 2/2016 | Perkowski | G06Q 10/063 |
| | | | 705/310 |
| 2016/0350886 A1* | 12/2016 | Jessen | G06Q 50/184 |
| 2017/0075877 A1* | 3/2017 | Lepeltier | G06F 40/117 |
| 2019/0057074 A1 | 2/2019 | Carey | |

OTHER PUBLICATIONS

A Comprehensive Guide to Natural Language Generation [online]. SciForce, Jul. 4, 2019. Retrieved from the Internet May 23, 2022: <URL: https://medium.com/sciforce/a-comprehensive-guide-to-natural-language-generation-dd63a4b6e548>.

* cited by examiner

PATENT APPLICATION PREPARATION SYSTEM AND TEMPLATE CREATOR

CROSS-REFERENCE TO RELATED APPLICATIONS

This application is a continuation-in-part of U.S. patent application Ser. No. 16/211,198, filed on Dec. 5, 2018 and issued on May 24, 2022 as U.S. Pat. No. 11,341,323, which claims priority from U.S. Provisional Patent Application Ser. No. 62/595,581, filed on Dec. 6, 2017, each of which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to automatic document creator systems and methods, and more particularly to the generation of patent application documents describing and claiming an invention.

Related Art

Document creation systems providing assistance in document drafting are generally known. In particular, document creation systems designed to aid patent attorneys, agents and pro se inventors have been developed to help increase drafting efficiency, standardize application formatting, and ensure that the patent application documents comply with the requirements of the United States Patent and Trademark Office ("USPTO"). Typically, patent applications have been manually drafted by patent practitioners or inventors and include a detailed description of the invention within predefined categories as set by the USPTO. For example, patent applications generally include a set of claims that particularly define the parameters of the invention, a specification which more generally describes the invention in view of the claims as well as other unclaimed features, drawings that illustrate various views of the invention and an abstract that briefly describes the invention as a whole. Patent drafting is largely a manual process which varies between each application wherein the drafters understanding of the invention and personal writing style inherently influence how the application is drafted. As can be expected with most manual processes, the drafting of a patent application not only takes a considerable amount of time to complete but also requires a significant level of training and experience before a practitioner or inventor is proficient at drafting an application. Accordingly, there is a desire in the industry to provide a system that aids the drafter of a patent application in the drafting process by reducing the overall time it takes to complete an application as well as to reduce the amount of training and experience needed before the drafter is capable of drafting an adequate patent application.

Perhaps the biggest factors when drafting a patent application is the evaluation of the prior art and differentiating inventive aspects of a device or method from the prior art in order to justify the patentability of the invention. Accordingly, at the outset of the patent preparation process, most patent practitioners conduct prior art searches targeted at identifying the closest prior art to the invention being described in the application. Once these prior art references are identified, the drafter will generally form the claims of the application in view of the prior art where the goal is to draft the broadest claims possible while avoiding the claimed features in the prior art references. Accordingly, the features in the newly described invention and in the prior art typically overlap with a few distinct differences being the innovative features claimed as the invention in the newly described invention.

Subsequently, because the nature of most inventions builds on existing technology and offers particular improvements to features that have already been recited in claims of other inventions, the general written description within the specifications largely overlaps the description of the inventions already known in the technical art. Accordingly, in many cases, only the new innovative features need to be described in greater detail, and these features can focus on the aspects of the invention being recited in the claims. Based on this overlap, there is an opportunity and a desire to those having skill in the art for development of a system that creates a template patent application based on the closest prior art references which can be edited by the drafter to include the distinctly innovative features recited in the patent application's claims while retaining the more general background information and secondary features that are not recited in the patent application's claims in a template.

Known prior art patent application preparation systems largely focus on automated document language standardization and auto drafting based on inputs by the drafter. For example, US Pat. App. Pub. No. 2013/0198092 describes a patent application preparation system that converts claim language entered by the drafter into various aspects of a patent including the specification and abstract. In operation, this system parses the entered claim language and automatically generates portions of the patent application. This reference is especially useful during the manual drafting and review process where changes to the claims are automatically reflected throughout the body of the specification and drawings. Additionally, this system can present different versions of the application at various stages of the application process in view of prosecution history information, such as a piece of prior art identified by the Examiner. Additionally, the system described in the '092 Application generates reference numbers for boxes shown on the flow diagram, and the reference numbers can be incorporated into the description corresponding to the flow diagram. Since the reference numbers are generated for the flow diagram boxes, they are not generated directly from the elements recited in the claims. Accordingly, there has been a need to provide a system that automates some of the most mundane and repetitive tasks associated with preparing the detailed description of the invention in a patent application.

A more recent reference suggests the use of natural language processing techniques to help automate the preparation of patent applications and also discloses methods for adding reference numbers to the detailed description. In particular, US Pat. App. Pub. No. 2019/0057074 teaches that the system identifies a reference number for each of the set of components or flowchart steps and particularly suggests performing a tree search function on a figure of the patent application data object and identifying a count of the set of components or flowchart steps based at least in part on the tree search function, and the reference number for each of the set of components or flowchart steps is based at least in part on the count. Similarly, U.S. Pat. No. 8,612,853 discloses a system for automatically inserting reference numbers in a patent application, but neither the '074 Application nor the '853 Patent teach or suggest a method in which the reference numbers can be generated directly from the steps, components, or other elements of the invention as recited in the claims and then matched with the illustrations of the invention as shown in the drawings. Additionally, neither of these prior art references teaches or suggests how they can be used to create additional reference numbers to new subject matter that is added to a prior art document and/or a patent application which already have reference numbers and are being used as a baseline for a new patent application.

There are also known software systems that can be used to evaluate claims in a patent application and compare the claims with the detailed description to determine if there is proper antecedent basis for the claim elements, such as the PatentOptimizer™ software system by LexisNexis. In evaluating the claims relative to the specification, the PatentOptimizer™ system can also identify elements in the claims that may not have a corresponding reference number in the detailed description. However, it is applicant's belief that the PatentOptimizer™ system does not include any automation tool for drafting a detailed description based on a properly formatted set of claims. Applicant submits that adding an automated drafting tool to the PatentOptimizer™ system would modify its principle of operation as a post-production tool to evaluate a patent application after it has been drafted.

The patent drafting process traditionally follows manual steps that greatly depend on subjective determinations made by the drafter, and existing application preparation systems focus on ensuring the drafter adheres to the formal requirements for the application's parts and uses highly structured language to define the invention in the claims and prose in the supporting detailed description to explain the various aspects of the invention. It naturally follows that there is a repetition of inventive elements in the claims and in the detailed description. While the known prior art references seek to reduce some of the mundane and repetitive tasks associated with preparing a patent application, the prior art fails to provide a system or methodology for using the record of invention and/or claims to automate the preparation of the detailed description in the patent application.

SUMMARY OF THE INVENTION

The invention is a patent application preparation system and template patent application creator based on a piece of prior art identified in a search report tool. Generally, the patent application preparation system described herein eliminates the necessity for a patent drafter to start from scratch with a new patent application for innovative improvements on widely known inventions. For example, certain working tools have been known and used for hundreds of years, and there may have been hundreds or thousands of patents associated with such tools yet patents on improvements still issue every year. Accordingly, when a new inventor develops an innovative improvement to such a wood working tool, the patent preparation system described herein allows the drafter of the patent for this innovative improvement to reuse the basic portions of a previously published patent or application in combination with the features of the new innovation. Beginning with a description of the current state of technology saves the drafter a substantial amount of time and costs associated therewith by eliminating the need for the drafter to draft a new application from scratch where instead the drafter need only focus on the sections of the application relating to the new innovation being claimed.

When the drafter of the patent application selects a particular prior art reference that defines the state of the art which is improved upon by the invention, the application preparation tool of the present invention parses the text within the prior art document and identifies the claim elements that define the scope of the prior art invention. These old inventive features can be highlighted in the claims and written description sections of the prior art references while the general body, format and unclaimed features of the prior art remain unchanged in an editable template form.

Another aspect of the patent preparation system is the record of invention form completed by the inventor of the practitioner prior to completing the patent application. Within the record of invention document the drafter identifies the newly innovative features of their invention. Subsequently, the record of invention form may be manually or automatically combined with the prior art template document to form a complete patent application.

Accordingly, another aspect of the invention is for the drafter to be able to review the template document made up of the base portion of the prior art along with the new innovative features of the inventor's invention. Subsequently, the drafter can manually edit the template document but does not necessarily have to go through the entire drafting process including drafting claim preambles and background sections.

In another aspect of the patent preparation system, a patent specification is prepared using claim language and natural language processing. The claim language can be prepared using the templating process or may be drafted separate from the templating process. Using the natural language processing and additional reference material that can be sourced from online searches, the detailed description can be formatted as prose with groupings of inventive features in paragraphs that generally correspond with the structure of the claims. In yet another aspect of the patent preparation system, an image processing tool can work with the natural language processor to annotate patent drawings with the reference numbers for the elements recited in the claims as well as additional reference numbers for features of the invention that are explained in the detailed description but are not recited in the claims.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiment(s) is merely exemplary in nature and is in no way intended to limit the invention, its application, or uses.

The invention described herein is a patent application preparation system 10 that operates on a computer processor 100 and automatically creates a template application 18 for a drafter based on a record of invention form 14 filled out by the inventor, practitioner or a combination of the two and at least one piece of prior art 12 identified in a search report. The preferred prior art document used to create the template is an issued patent 52a or a published patent application 52b that meets the formal requirements set by the USPTO. However, other prior art references may be used so long as the piece of prior art selected to be made into a template has a claim set 24 and a specification 26.

Generally, the patent application preparation system described herein eliminates the necessity for a patent drafter to start from scratch where instead a template application is automatically created from a prior art reference. The template saves the drafter substantial amounts of time and costs associated therewith by eliminating the need for the drafter to draft a new application from scratch where instead the drafter need only focus on editing the sections of the application relating to the new innovation recited in the claims through inputs 54 into an editing program 20 running on the computer processor. Additionally, the drafter may operate even more quickly by automatically uploading the information from the record of invention form into the template without completing any edits, for example when the inventor is up against a critical date and the drafter does not have a substantial amount of time to make multiple edits. Accordingly, an aspect of the patent application system is a prior art document in a field of technology related to the innovative features of the inventor's invention.

Patent practitioners typically conduct or have a search firm perform a search 28 for prior art references that may preempt their inventor's invention. In this preparation system the drafter need only provide a single prior art reference in a text form 58 to be parsed by the parsing program 16 described below. In one embodiment the prior art may be provided by an independent search conducted by the practitioner, search firm or another external searching party. However, the preferred embodiment combines the patent application preparation template creation system with an innovative searching tool 50.

Search Tool with Automatic Report Generation

The preferred search report tool allows its users to search for patents and create a report using the details of the patent, automatically populating in an editable report. The search report tool is preferably linked to a Google search engine but may operate with any other search engine that may return patents and patent applications as results. In operation the user enters a search parameter in the search bar and hits a search button. Additionally, the system automatically adds "invention" to the end of the search string before sending the string to the search engine. The system them queries the search engine, preferably Google scholar, with the search string and returns the most relevant results. As the number of returned results may vary, one embodiment of the search tool may return the top twenty (20) results, for example for free users, and another embodiment of the search tool may return the top forty (40) results, for example for paid users. It should be appreciated that the number of results returned by the search tool vary and they are not intended to limit the scope of the invention. Once the query is complete the results are displayed in a listing page similar to the Google search results page. Subsequently, the user can click on any results and the details of the search will be displayed in another page similar to how they are displayed in Google scholar for the user's review.

Once a user reviews the selected page, an "Add to Report" button will appear that allows the user to save the results from the page into the prior art report. Of course, if the user does not believe the reference is relevant to their invention they may elect to return to the list of results without adding the result to the report. When the user does determine the reference is relevant to their invention and clicks the "Add to Report" button a report is created and aspects of the selected reference are saved within the report. Although the general view of the report may vary the search report tool particularly saves the following mandatory fields: inventor name, name or person performing the search, e-mail address where the report is to be sent, mobile phone number of person receiving report, invention title and a short description of the invention, preferably extracted from the abstract. Some of these parameters are accordingly pulled directly from the selected reference while others must be entered by the user conducting the search. For example, the invention title and short description of the invention are pulled from the selected reference as shown in the drawings. Conversely, the email address, mobile number and name of searcher must be manually entered by the user conducting the search.

After electing to add a result to the search report the user has the option to categorize the references based on relevancy and add comments for each result. The user may accomplish this by entering free form text of up to 500 words in the "Comments" section. Additionally, a "Relevancy Rating" can be applied from a drop down list in a scale of "Extremely relevant", "Very relevant", "Closely relevant" and "Relevant". Additionally, the user will have the opportunity to add a figure to the search report from a listing of the figures displayed in the Google search result. After these additions are made the user will get a message box stating "Details added to report" that confirms the reference has been successfully added to the search report. If there is an error in adding the details, the user should see "Error in adding details to the report, please try again later".

After the details for the selected reference are added, the user will return to the search page that has the results from the search query. This process is then repeated until the maximum number of search results have been added to the search report or the user determines the search is complete. As the preset number varies for free and paid users the free user will be given the option to become a paid user in order to save the search report within the search report tool and to conduct additional searches. Preferably, the comments and rating should be encrypted in the system database for each of the searches. Additionally, as indicated above, the patent application preparation creation system and the innovative searching tool are preferably combined, and the entirety of the search reports can optionally be saved by the system for the users to access them later. If they do not wish to pay, the search report will be sent to them via email but it will not be saved within the search report tool for later access. Also, if a free user gets to the maximum of twenty (20) search results in the report, the user will again be given the option to become a paid user to add more records to the search.

During the searching process free and paid users may edit their search report in various ways, including being able to delete the report itself, delete one or more references from the report, change the comments, change the rating as well as being able to save and cancel the report. As mentioned above, free users cannot save the report but have the option to pay and save at any time during the search process. Subsequently the report will be emailed in a pdf format to the free user. The paid users will be given the option of getting the report as a pdf document, a formatted word processing document (rtf), and a spreadsheet document (csv), and will be provided with the option of receiving two (2) or all three (3) of these documents. For free users, once the report is sent the user will get a message "Report has been sent to <email>". Post sending, the user's report will not exist in the session. The user can search again and create another report again.

The search report tool also collects user feedback where at the end of their session, the free users will be polled for a user rating, a user experience and a user interest and they will be given a Suggestion & Comment box. The paying users will be given this option at the end of their first search and at the end of each subsequent search will be asked whether they want to take the poll again and whether the search tool has become easier with subsequent uses.

Accordingly, the patent application preparation system may use a result from the described search report tool. Additionally, the search report tool may be incorporated with the patent preparation system where a "Create Template Application Based on this Result" button may be selected by the user and a subsequent template according to the present invention may be created.

Preparing Patent Application Using Template Documentation

Although the search report tool and patent application preparation system described herein preferably return as a search result and use as a template base issued patents and published patent applications, respectively, the prior art reference providing the base for the template need only have a set of claims and a specification. As required by the USPTO and as explained in the background section, the claim set within the reference particularly claims the old inventive features 30 of the invention being described. Conversely, the specification describes not only the particular aspects recognized by the inventor as their inventive features and recited in the claims but may also describe more general features, background information, related art, alternative embodiments, preferred uses and other information and technical terms that relate to the invention but are not recited in the claims. Additionally, the specification includes multiple subsections including but not limited to an abstract section 40c, a background of the invention section 40a, a detailed description 40b of the invention section, and a description of the drawings 40d section which generally describe more than the particular elements recited in the claims. Accordingly, the specification also preferably includes one or more drawings 44 that supplement the text portions of the specification and the claims. The parsing program described below parses the reference and differentiates the old inventive features recited in the claims and described in the specification from the other general information found in the specification that does not appear in the claims.

Accordingly, another aspect of the patent application preparation system is a parsing program that identifies 34a the inventive features in the claims and specification and compares 34b the identified elements of the claims in the identified prior art reference to the elements in the specification of the identified prior art reference. Once these elements are identified and compared, the parsing program highlights 34c the similar features in both the claims 62a and the specification 62b while leaving the remaining portions 62c of the claims and specification intact. For example, an inventor may claim element X in the claims and subsequently describe element X in the specification. However, the inventor may also describe elements A, B and C in the specification without reciting elements A, B and C in the claims. The parsing program therefore recognizes that element X is in both the claims and the specification and suggests that element X is the innovation in the prior art reference. Conversely, elements A, B and C are not the claimed features and therefore are included as background information, support or general information regarding element X. Thus, the parsing program will highlight element X in the specification and claims while retaining elements A, B and C as a template patent application.

It is also possible that the drafter may enter particular features of the invention into the parsing program and the parsing program can highlight these features in the prior art reference. In a semi-automated version of the parsing program, the parsing program could have a table of similar terms in which the drafter can identify aspects of the improvement invention, including standard features and innovative features, and the drafter would also identify corresponding terms used for the features in the prior art reference. In a more automated version of the parsing program, the terms entered by the drafter could be run through a synonym engine to identify other synonymous terms that may have been used in the prior art reference.

The parsing program is another aspect of the present invention that produces a baseline prior art document 36 based on the parsed prior art document. The template document acts as a shell for the drafter whereby they do not necessarily have to edit or draft all sections of the shell from scratch but need only supplement the template with new information. With the old inventive features removed from the claims and the specification, the drafter need only insert the inventor's new inventive features 32 into the template document. Of course, the drafter may elect to reword, supplement and/or remove sections from the template document where they see fit. However, it is an aspect of the patent preparation system described herein to provide the drafter with a presentable version of an application without necessarily having to redraft general sections of the specification, which are instead provided by the template document.

In an alternative embodiment, the drafter can select a prior art reference, such as a patent, that is determined to be similar to the invention or that has a good general description of the current state of the art 42a in the area of technology or a description of older inventive features 42b. The parsing program would select a representative claim or set of claims from the prior art reference and provide the claims to the drafter to identify the features that are commonly known and those features that are more directed to the prior art invention. The parsing program can also allow the drafter to identify the new innovative aspects of the invention and may also allow the drafter to link those commonly known features to similar features in the invention. The drafter would be given options for combining the new innovative aspects of the invention with the prior art reference's claims in place of the prior art's unique features.

To help determine the new inventive features, the drafter (inventor or practitioner) preferably completes a record of invention document that particularly describes the innovative features which the inventor regards as their invention. In an embodiment of the patent application preparation system the practitioner may only reference this record of invention where they manually insert claim language and description sections into the template document. However, in another embodiment the record of invention document may be linked to the template document where sections of the completed record of invention are automatically merged within the claim set and/or specification section of the template document and thereby result in a presentable patent application which not only complies with formal filing requirements but also adequately describes the invention in view of the prior art reference identified by the practitioner or inventor as being the closest reference to the inventors invention. Further, the drafter may also include a new claim set 38 claiming the new inventive features in the record of invention document prior to uploading the record of invention and prior art document into the template creation system. Accordingly, the system can update the old claim set with the new claim set 56 when integrating 64 the baseline prior art document with the record of invention document in the integration program 60 and thus provide a more complete template. The document integration program combines the baseline prior art document and the record of invention document, producing the template document. The integration program can replace the old inventive features with the new inventive features in the template document, can add the new inventive features to the old inventive features in the template document, and/or can replace the old claim set with the new claim set in the template document.

Modification of PatentOptimizer™ System According to Present Invention

It will be appreciated that the teachings of the present invention can be used to run the PatentOptimizer™ system in an iterative manner with a prior art reference, a record of invention document, and a separate word processing program to produce a template patent application document similar to the template document that is produced from the search tool. Since the PatentOptimizer™ system does not have a document integration program, it has no way to combine a record of invention document with a baseline prior art document. However, a user could perform an iterative process as summarized below to create a template patent application document that approximates the results of the template document that is achieved by the document integration program of the present invention.

1. Use the word processing software to manually replace the claims in the baseline prior art document with the claims that are in a record of invention document and to add the new inventive features from record of invention into the baseline prior art document's specification.
2. Run the PatentOptimizer™ antecedent basis and thesaurus routines to identify the elements in the claims that do not have proper antecedent basis in the specification.
3. Use the word processing software to add to the baseline prior art document's specification those elements in the claims that the PatentOptimizer™ has identified as lacking proper antecedent basis.
4. Run the PatentOptimizer™ antecedent basis and thesaurus routines again to confirm that the elements in the claims have proper antecedent basis in the specification.

There are other steps that could be performed, such as starting the process by using the word processing software to only replace the claims in a template document so that the first run of the PatentOptimizer™ antecedent basis and thesaurus routines would help the user identify the sections of the claims that are most likely not inventive because there would already be antecedent basis in the baseline prior art document's specification even without the addition of the record of invention's new inventive features. It will be appreciated that the document integration program can include a natural language processor that can transform the claims into prose and combine the prose with the baseline prior art document's specification. As described in detail below, the natural language processor can begin the drafting process for the specification using the sets of claims rather than starting with the baseline prior art document's specification. Additionally, the capability of the natural language processor to create reference numbers for claim elements and technical terms can be combined with the parsing program and the document integration program. In this regard, natural language processor can create an entirely new database of reference numbers that uniquely correlate to the claim terms or the prior art reference can first be parsed to create a database of reference numbers for all of the technical terms that are in the baseline prior art document regardless of whether they are recited in the claims or not. When the parsing is performed, the natural language processor checks for the new claim elements and their synonyms in the database, and the document integration program combines the new claim set and any additional new inventive features and technical terms that may be documented in a record of invention. Due to the uniqueness of process claims and their complexities of language, a simple synonym engine will not be satisfactory to match new claim elements with the technical terms in the baseline prior art document. Accordingly, for method inventions, the natural language processor is more likely to create an entirely new database of reference numbers that uniquely correlate to the new claim terms rather than using the existing reference number scheme in the baseline prior art document. The natural language processor creates additional reference numbers for the new claim elements and technical terms in creating the template document. As discussed in detail below, the natural language processor can also transform the highly structured claim language into prose which is combined into the detailed description.

Review Program

In another aspect of the patent application preparation system an innovative review program 22 and process is presented when the patent application created by the preparation system is filed as a provisional patent application ("PPA") with the USPTO. As PPAs are not reviewed by Patent Examiners and merely act as a place holder for the eventual non-provisional utility application that is prosecuted within the USPTO, an inventor and a practitioner do not receive any feedback as to the likelihood that they will be successful during the prosecution of the full utility application. Accordingly, the preparation system described herein provides a review feature that may be incorporated with the paid users subscribing to the search report tool described above or as an additional feature purchased by users who do not use the search report or templates described herein. Alternatively, a finalized template may also be submitted to the review program for review before a PPA is filed.

As part of the innovative system of the present invention, once the template is finalized and the PPA is submitted to the USPTO, the PPA is also submitted to a panel of independent reviewers 46 for a search and evaluation 48a similar to what would be performed during the First Action Interview pilot program for non-provisional patent applications. In the preferred embodiment, the panel of reviewers is made up of retired patent examiners and/or patent attorneys who have expertise in reviewing patents, drafting claims, patent applications and are experienced with the patent prosecution process. Within a period of time of having received the PPA, the application will be assigned to an individual reviewer who will review the application, cited prior art references, claims, drawings and any other information submitted with the PPA. Like a standard review by the USPTO of a utility patent application, the reviewer will conduct a subsequent internal search and provide a search report to the user who submitted the PPA prior to the filing deadline for the non-provisional patent application. The reviewer may include an evaluation similar to a standard office action although the Pre-Interview Communication under the First Action Interview pilot program is more preferable. In addition to the search report and any other communication, the reviewer identifies subject matter in the claims that appear to be patentable and whenever possible, the reviewer provides at least one example claim that the reviewer believes could be patentable. The potentially patentable example claim may be a form of a claim prepared by the drafter and amended by the reviewer 48b or it could be a new claim drafted by the reviewer 48c.

In operation, this example claim is preferably presented as part of the evaluation. In the preferred embodiment the reviewer will provide a new claim that they have drafted which in their experience would support a high likelihood of patentability. However, other embodiments may have the reviewer merely amend the user's claim(s) that are submitted to them in such a way that the amended claim(s) would be patentable in view of the prior art identified by the user and the reviewer. Accordingly, this reviewing system gives the user a first glance at what type of rejections may come from the USPTO and a first opportunity to amend the claims into a form that may be more likely to be deemed patentable by an Examiner during prosecution of the utility patent application.

Preparing Patent Specification Using Claim Language and Natural Language Processing Rather than use a prior art reference as a template for the detailed description as described above, a natural language processor could be used to transform the claim set into the detailed description. The claim set has a highly structured format that begins with a preamble statement with a colon at its end and followed by a set of phrases in which the elements of the invention are recited. There is a semicolon at the end of each phrase, and each claim ends with a period at the end of a last phrase in the set of phrases. There can be multiple claim sets, and each claim set begins with an independent claim and is usually followed by one or more dependent claims. The dependent claims can add new elements and can further define elements that are in the independent claim or other dependent claims. There can be sets of the dependent claims with one set that further defines one element in the independent claim while another set further defines another element in the independent claim and yet another set that recites one or more new elements.

Generally, the natural language processor determines each unique element in the claim set and transforms the preamble and the set of phrases into a prose that describes the invention. The natural language processor duplicates each one of the elements in the claim set in the prose, preferably duplicating and reformatting the preamble and the set of phrases to produce a less complicated sentence structure in the prose. For example, where the independent claim would only have a period at the end of the last phrase and all of the other phrases would have a semicolon at their respective ends, the natural language processor would transform the phrases into multiple sentences in the prose with periods at the end of the sentences. The natural language processor may also transform the preamble into a separate sentence which would eliminate the colon and add another period.

In transforming the claim set to prose, the natural language processor can use the groupings of inventive features in the claim set to create paragraphs that generally correspond with the structure of the claims. For example, a set of dependent claims that further define one element in the independent claim or within another dependent claim can be transformed into a group of sentences in a paragraph of the prose. Similarly, another set of dependent claims that further define another element can be transformed into another group of sentences in another paragraph of the prose. Further, yet another set of dependent claims that recite one or more elements that are not recited in the independent claim can be transformed into yet another single paragraph or multiple paragraphs. Generally, the natural language processor uses the relationship between the elements in claims to produce paragraphs in the prose.

To further aid in the description of the invention, the natural language processor creates unique reference numbers for each one of the elements in the claim set. With the unique correlation between the reference numbers and the elements, the natural language processor can automatically add the reference numbers adjacent to the elements in the prose. The natural language processor preferably numbers elements differently for a process claims as compared to apparatus claims. The natural language processor categorizes the elements recited in a set of steps for process claims and also categorizes the elements recited in a set of cooperative relationships in apparatus claims because it is possible that multiple elements in the apparatus claims may be recited together in a single element for the process claims. Accordingly, the natural language processor could use one set of reference numbers for the apparatus elements and another set of reference numbers for the process elements. According to patent application convention, the reference numbers follow the corresponding elements.

Instead of intermixing reference numbers for apparatus elements and process elements, different numbering conventions can be used for the apparatus elements and the process elements. For example, the natural language processor could begin the reference numbers for the process elements at the next even hundred greater than the highest reference number for the apparatus elements. To further differentiate apparatus elements and process elements, the natural language processor can use different increments between the reference numbers for apparatus elements and process elements. For example, the reference numbers for apparatus elements and process elements can be incremented by two (2) and ten (10), respectively.

In many patent applications, the detailed description includes additional technical terms that are not recited in the claim set. Some of the technical terms may be included in the background section of the invention. Accordingly, to help in drafting the detailed description, the natural language processing tool can connect with and search online resources through a computer communications network and preferably performs an automatic search of the online resources for the set of technical terms and the elements recited in the claim set. The natural language processor automatically provides a plurality of hyperlinks to additional information from the set of online resources for the technical terms and the elements. The user can follow the hyperlinks to review the technical documents available through the online resources and can either provide the natural language processor with a selection of a set of the hyperlinks to a portion of the information from the set of online resources and/or may provide the natural language processor with copies of portions from the technical documents. Preferably, the natural language processor receives the hyperlink selection and/or the copies with corresponding technical terms and elements and enhances the prose associated with the technical terms and the elements according to the portion of the information from the set of online resources. Even if the technical terms and elements are not provided with the hyperlink selection and copies, the natural language processor can refer back to the search results to make the correlation. Additionally, the user can instruct the natural language processor to include at least some of the technical terms in the database with the elements so that reference numbers are also created for the technical terms.

A template specification can be used for the natural language processor to populate the claim set and the prose. The template specification can be a document with a predefined format or it can be a set of formatting instructions for creating the document with the predefined format. It will be appreciated that the creation of a template document using a baseline prior art document as described above can be used to produce a claim set to begin the process for creating the detailed description using the natural language processor. In particular, a prior art document has at least one old independent claim with at least one old inventive feature and also preferably has claims that depend from the old independent claim. The record of invention document has at least one new inventive feature that is different from the old inventive feature as determined by the parsing routine. The new inventive feature is combined with the old independent claim into a new independent claim with the document integration program. The new inventive feature could replace the old inventive feature or could enhance details of an element in the old claim. The document integration processor formats the new independent claim and the dependent claims into the claim set. It will also be appreciated that the claim set could be run through the Lexis PatentOptimizer™ program to ensure that the formatting is standardized and the elements in the claim set have proper antecedent basis.

As described above with reference to the document integration program, the natural language processor can add reference numbers to newly added claim elements and technical terms when creating the template document from the baseline prior art document. This technique for adding reference numbers is particularly useful when drafting a continuation patent application or continuation-in-part (CIP) patent application that claims priority to a parent application. When drafting a continuation application, some technical terms that may not have been given a reference number in the parent application may be recited as elements in the new claim set, and the document integration program combined with the natural language processor can add reference numbers to these new elements rather than creating an entirely new database of reference numbers and elements. Similarly, a CIP application is typically expected to have additional reference numbers that are created for new elements and some new technical terms that the integrated software system determines to be in the newly added subject matter. As with the prior art document, the parsing program can create a database of reference numbers that uniquely correlate to the claim elements and other technical terms that are in the parent application. The new claim set and any additional new inventive features and technical terms may be documented in a record of invention, and the natural language processor can refer to the database created by the parsing program when creating additional reference numbers for the newly added claim elements and technical terms. The parsing program can also be used in combination with the natural language processor to particularly identify the sections of the new claims that are not in the parent application so the natural language processor evaluates both the claim set and the existing detailed description when transforming the claim language into prose. The document integration program combines the newly created prose with the existing detailed description and also adds the new claim set and any additional background information and other disclosure in the record of invention to produce the template document.

The combination and/or integration of the natural language processor with the parsing program and document integration program allows a user to have the option of using a prior art document or a parent patent application as the baseline document for drafting new claims for a patent application. When the user selects the option of using a baseline document, the parsing program creates the database of the reference numbers as described above. The record of invention document contains at least the new set of claims and may also include background information, such as from the search report, and other technical information, and the natural language processor adds new reference numbers to the database. The natural language processor transforms at least the claim language into prose, preferably accounting for the existing detailed description in the baseline document, and the document integration program combines the newly created prose with the existing detailed description as well as the new claim set and any additional background information and other new technical disclosure that is in the record of invention document. As indicated in the Background section above, although the '074 Application and the '853 Patent disclose computerized systems that can automatically add reference numbers to a newly drafted patent application, it will be appreciated that the principals of operation of these prior art systems would have to be changed to use a baseline document which already has a set of reference numbers as in the present invention.

The natural language processor could be used with the parsing program and the document integration program to create the background section, the summary of invention, and the abstract for a patent application. Using the parsing program, the inventive elements in the new claim set can be compared with the elements recited by old claims in the closest prior art references, and the natural language processor and document integration program can select portions of the baseline document to be used in populating the background section of the template document. Additionally, information from the search results can be placed in the record of invention document and used by the natural language processor to produce the background information and the related art; this would be particularly helpful to produce the background section when no baseline document is being used. The new claim set can also be the source that the natural language processor uses for creating the summary of invention and the abstract. The natural language processor can use a comparison of the background information with the claim set when creating the summary of invention section. The natural language processor creates a short prose based on an independent claim and possibly some elements in some dependent claims for the abstract.

The natural language processor could allow for the claim language to be in a format that differs from the single sentence structure that is required for a patent application. For example, the claim language could be in a table format in which the preamble and each of the phrases are in their own sections. These sections would correspond to the standard punctuation found in the claim set (i.e., colons, semicolons, and periods). As another example, the claim language could be in an outline format in which the preamble and each of the phrases are in a hierarchy of headings, subtopics, and sub-subtopics (or numbering for decimal-type outline) which corresponds to the standard claim punctuation. Accordingly, the colons, semicolons, and periods referred to relative to the claim set as described above and as particularly recited in the claims appended hereto generally refer to any type of highly structured formatting for claim language.

Annotating Patent Drawing with Image Processing Tool and Natural Language Processing The natural language processor can be used in combination with an image processing tool to automatically annotate the illustrations in a set of patent drawings with the reference numbers. A database of the reference numbers uniquely correlated to the elements is created, and the illustration is illustrated with the image processing tool for object recognition. The image processing tool identifies features of the illustration corresponding with the elements in the database in a set of feature-element pairs, and the image editor program automatically edits the illustration to annotate the features identified in the illustration with the reference numbers uniquely correlated to the elements and adding lines between the reference numbers and the features in the set of corresponding pairs. The image processing tool preferably determines and differentiates between flowchart features and structural features in the illustration and matches structural features with apparatus elements and matches flowchart features with process elements. It will be appreciated that there will be instances in which the image processing tool fails to produce a match for one of the elements in the claims with the illustration's features. In such a case, the image processing tool notifies the user of the element without the match. The user can input into the image processing tool a particular feature of the illustration that corresponds to the element that the image processing tool could not match, and the corresponding reference number is added to the illustration. Preferably, a machine learning engine provides the manual match information from the user as feedback to the image processing tool to improve the automatic identification of features.

Even without an image processing tool, the natural language processor can be used with the image editor program to add reference numbers to the illustrations. The database of the reference numbers uniquely correlated to the elements would be created, but rather than using the image processing tool, the user would annotate the illustration with the text of the elements that correspond to the features shown in the illustration. The image editor would replace the elements annotated on the illustration with the reference numbers corresponding to the elements in the database. In another alternative embodiment, the user can select the reference number corresponding to an element and identify the feature of on the illustration, and the image editor program can place reference number in the illustration's open space. For reference numbers corresponding to apparatus elements, the editor can also add a line from the reference number to the selected section of the illustration. For reference numbers corresponding to process elements, the editor preferably does not add a line.

Image processing tools and machine learning in object identification, such as performed by Google's Lens™ app and the inventions associated therewith (U.S. Pat. No. 9,973,705), continue to be enhanced and improved (U.S. Pat. No. 10,469,755). The '705 Patent and the '755 Patent are incorporated by reference in their entireties. Similar to the object identification of physical structures, image processing tools can be used to identify the various shapes of the flowchart symbols, circuit schematics, and other representative drawings, and machine learning will continue to improve the accuracy of the object identification. Accordingly, to the extent that the representative drawings accurately depict the features of the invention shown in the illustrations, the detailed description of the invention can be based on the claims as described above and can be enhanced by a machine generated technical description according to the illustration. Further, when there is text on the illustration, the text can be parsed and matched with elements in the claim set. It will be appreciated that the text may first be determined through an optical character recognition tool so it can be compared with the elements.

Figure 1:
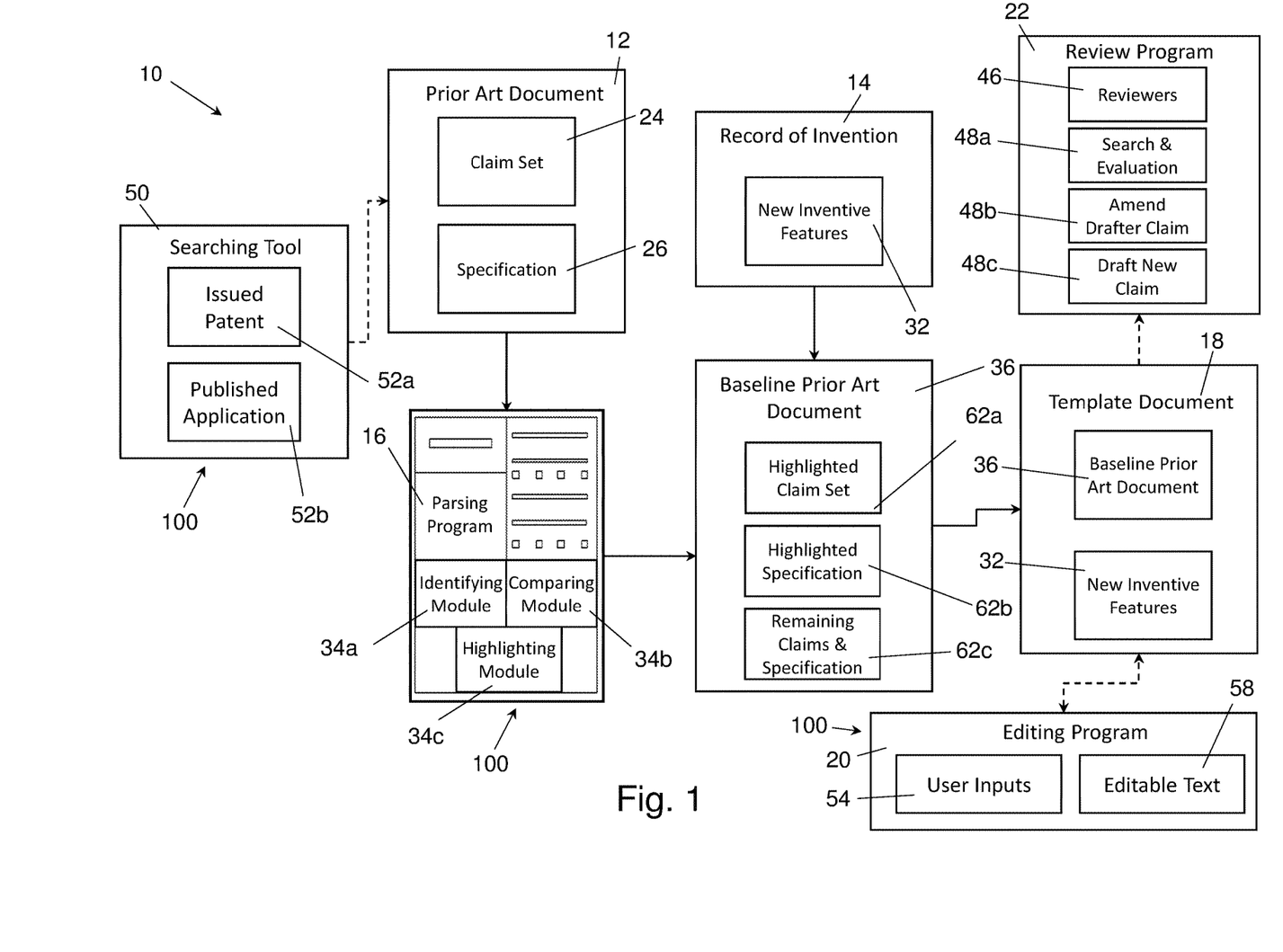
FIG. 1 illustrates a flowchart of the process to create a template document for a patent application using a baseline prior art document according to a preferred embodiment of the invention.
Figure 2:
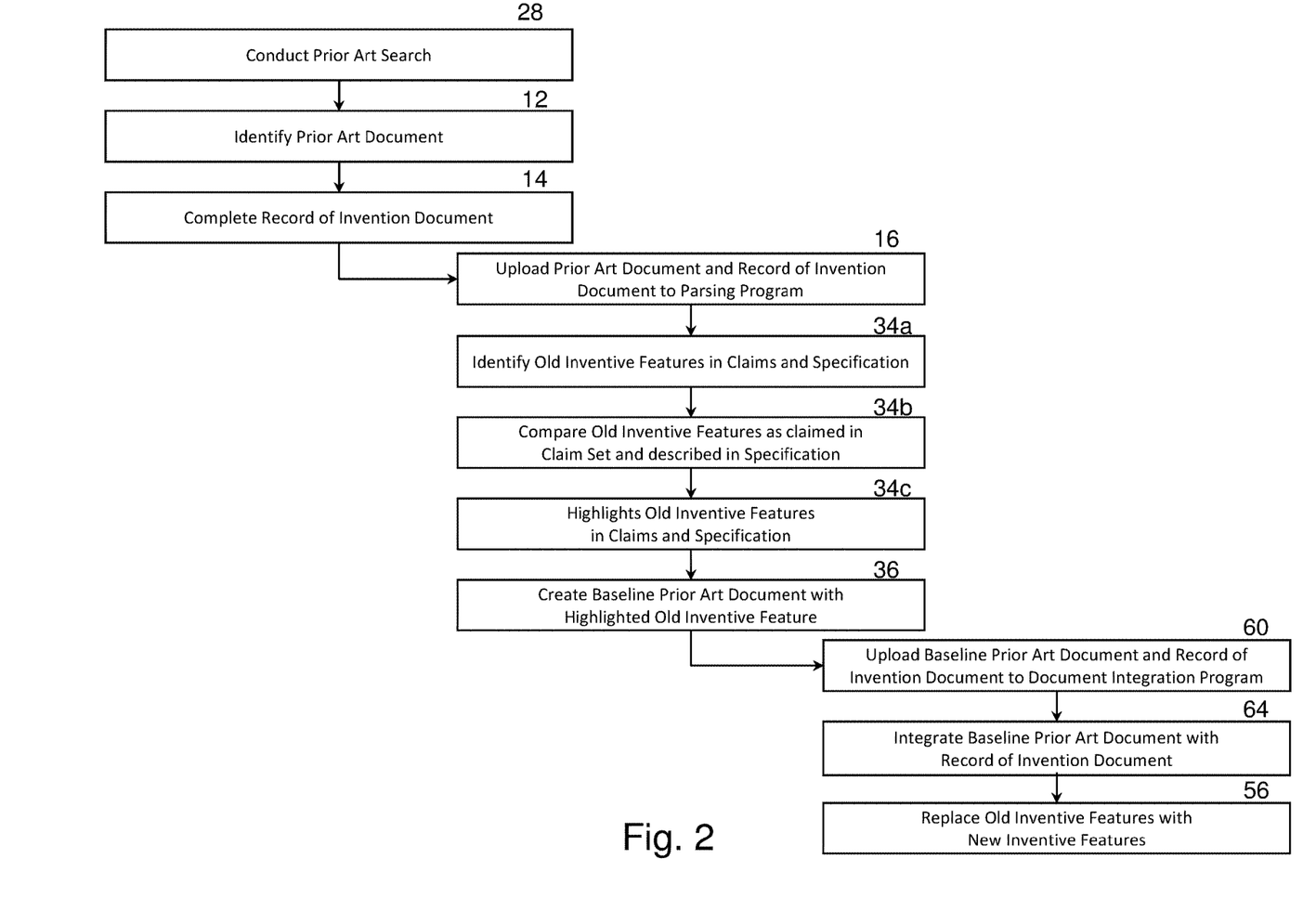
FIG. 2 illustrates a logic path to create the template document.
Figure 3:
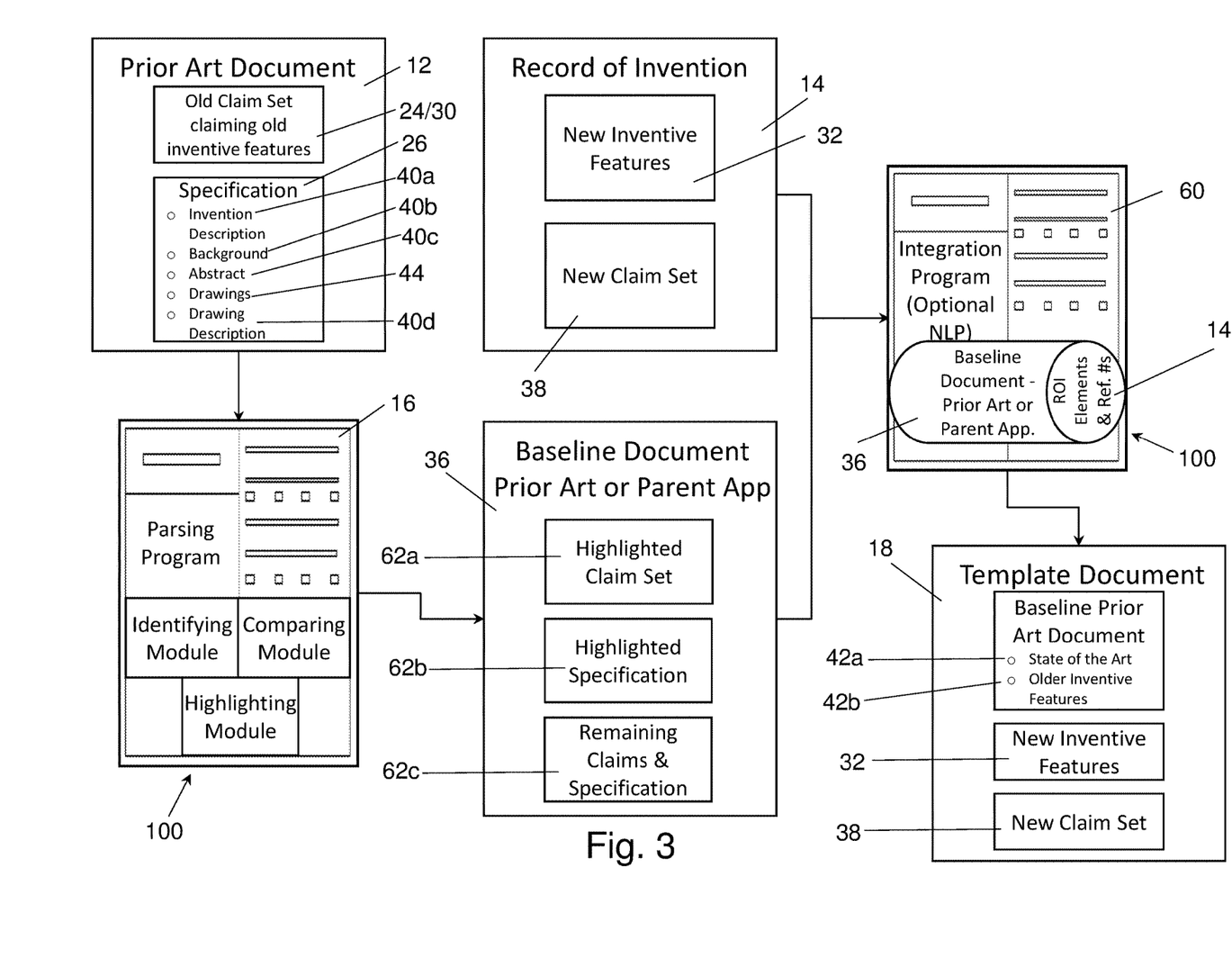
FIG. 3 illustrates a flowchart the process to create a template document for a patent application using a baseline prior art document according to an alternative embodiment of the invention.
Figure 4:
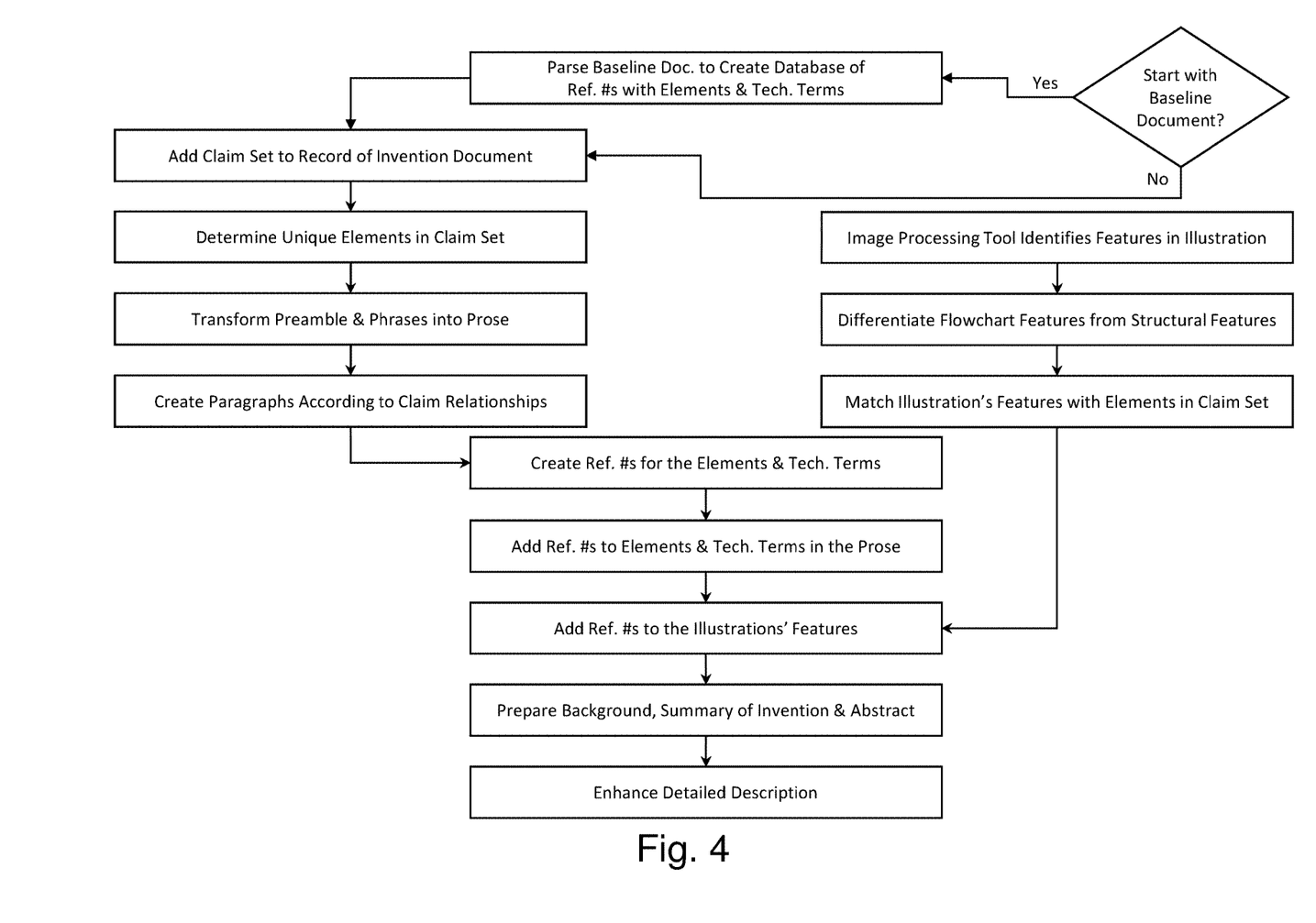
FIG. 4 illustrates a logic path to transform claim language into prose for a detailed description and for adding reference numbers to drawings in a patent application.
Figure 5:
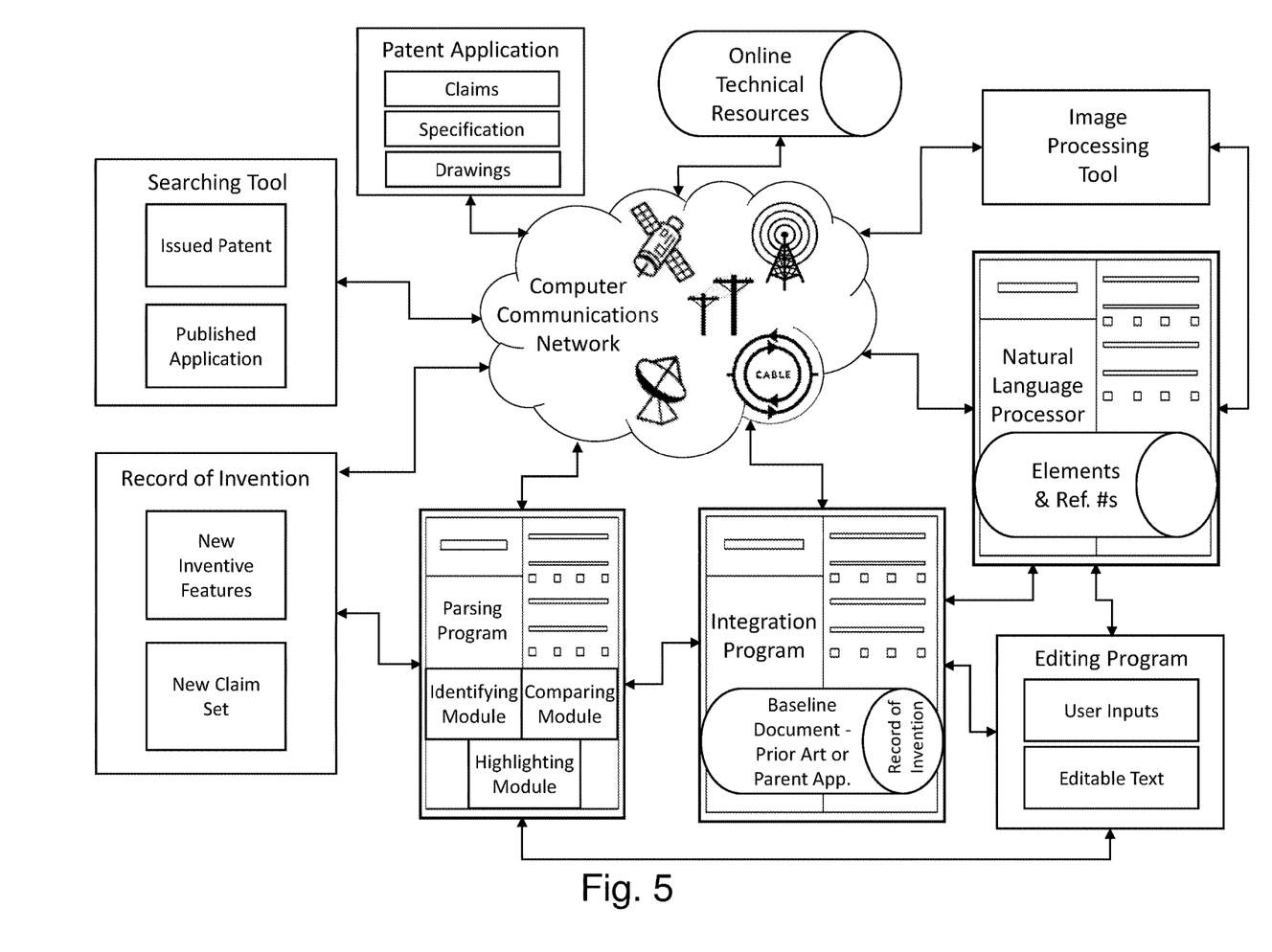
FIG. 5 illustrates a system diagram of the computational tools and processors with the invention inputs and the patent application output documents.

As illustrated in FIG. 5, the computer processing can be web-based software programs that run on banks of computer processors that are in communication with each other through a computer communications network. As evident from the description of these software tools, they may also be run on a general purpose computer as one or more computer programs that can communicate with each other. It will also be appreciated that in some implementations, the software tools could be integrated into a single software tool.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the use of the natural language processing tools that are used to transform highly structured claim language into a detailed description as prose could similarly be used to transform a structured outline for a complaint, answer, or other litigation documents into a fully formed document. Thus, the breadth and scope of the present invention should not be limited by any of the above-described exemplary embodiments, but should be defined only in accordance with the following claims appended hereto and their equivalents.

What is claimed is:

1. A method for automating the preparation of a patent application document for describing an invention, comprising the steps of:
  providing a claim set, wherein the claim set recites a plurality of elements in a highly structured format, wherein the highly structured format is comprised of a preamble statement, a set of phrases in which the plurality of elements are recited, a semicolon at the end of at least a first phrase in the set of phrases, and a period at the end of a last phrase in the set of phrases;

determining with a natural language processor each unique element in the plurality of elements, wherein the natural language processor operates on a computer processor; and transforming with the natural language processor the preamble and the set of phrases in the highly structured format into a prose describing the invention in the patent application document, wherein the prose doesn't have the highly structured format of the preamble and the set of phrases and has a less complicated sentence structure than the preamble and the set of phrases.

2. The method of claim 1, wherein the transforming step is further comprised of the natural language processor duplicating each one of the elements in the claim set in the prose.

3. The method of claim 1, wherein the transforming step is further comprised of the natural language processor duplicating and reformatting at least one of the preamble and the set of phrases in a single sentence claim of the claim set to produce a plurality of sentences in the prose with a corresponding plurality of periods, wherein the preamble is further comprised of a colon at its end, and wherein the transforming step is further comprised of the natural language processor replacing at least one of the semicolon and the colon with one of the periods.

4. The method of claim 1, wherein the highly structured format is further comprised of a plurality of phrases between the first phrase and the last phrase in the set of phrases, wherein the phrases have semicolons at their respective ends, and wherein the transforming step is further comprised of the natural language processor reformatting one of the phrases to produce a plurality of sentences in the prose with a corresponding plurality of periods.

5. The method of claim 1, further comprising the step of creating with the natural language processor a plurality of paragraphs in the prose, wherein the claim set is comprised of an independent claim and a plurality of dependent claims, wherein a first set of the dependent claims depends from a first element in the independent claim, wherein a second set of the dependent claims depends from a second element in the independent claim, wherein the creating step transforms the first set of the dependent claims into a first group of sentences in a first paragraph of the prose, and wherein the creating step transforms the second set of the dependent claims into a second group of sentences in a second paragraph of the prose.

6. The method of claim 1, further comprising the step of creating with the natural language processor a plurality of reference numbers for the plurality of elements in the claim set.

7. The method of claim 6, further comprising the step of the natural language processor uniquely correlating the reference numbers to the elements, and wherein the transforming step is further comprised of the natural language processor adding the reference numbers to the prose in a position adjacent to and following the corresponding elements.

8. The method of claim 7, further comprising the steps of:
providing a drawing set with at least one illustration;
creating a database of the reference numbers uniquely correlated to the elements;
analyzing the illustration with an image processing tool for object recognition;

identifying with the image processing tool a plurality of features of the illustration corresponding with the elements in the database in a set of feature-element pairs; and automatically editing the illustration to annotate the features identified in the illustration with the reference numbers uniquely correlated to the elements.

9. The method of claim 8, wherein the determining step is further comprised of categorizing with the natural language processor the elements recited in a set of steps in a process and the elements recited in a set of cooperative relationships in an apparatus, wherein the determining step is further comprised of identifying with the natural language processor a set of the elements for the apparatus that are recited together in a set of the elements for the process, wherein the creating step uses a first set of reference numbers for the elements for the apparatus and a second set of reference numbers for the elements for the process, wherein the analyzing step determines in the illustration's features at least one of a set of flowchart features and a set of structural features, and wherein the identifying step is further comprised of matching the set of structural features with the set of the elements for the apparatus and matching the set of flowchart features with the set of the elements for the process.

10. The method of claim 8, wherein the identifying step fails to produce a match for one of the elements in the claims with the illustration's features, wherein the image processing tool notifies the user of the one of the elements without the match, and wherein the image processing tool receives a user input matching a particular feature of the illustration corresponding to the one of the elements without the match from the identifying step.

11. The method of claim 8, wherein the editing step is further comprised of the step of adding a plurality of lines to the illustration, wherein the lines extend between the reference numbers and the features in the set of corresponding pairs.

12. The method of claim 7, further comprising the steps of:
providing a drawing set with at least one illustration;
creating a database of the reference numbers uniquely correlated to the elements;
annotating the illustration with the elements corresponding to a plurality of features in the illustration, wherein the elements are in a text format; and
automatically editing the illustration to replace the elements annotated in the text format on the illustration with the reference numbers corresponding to the elements in the database.

13. The method of claim 6, further comprising the steps of:
providing a template for the natural language processor to populate the prose, wherein the template is comprised of at least one of a document with a predefined format and a set of formatting instructions for creating the document with the predefined format;
providing a record of invention document with the claim set, wherein the elements in the claim set are comprised of a set of old elements and a set of novel elements;
providing at least one of a prior art document and a parent application as a baseline document, wherein the baseline document comprises at least one old claim set;
parsing the baseline document with the computer processor to create a database of reference numbers and the corresponding technical terms;

producing a set of synonyms corresponding to the elements in the claim set or corresponding to the technical terms using a synonym engine;

comparing with the computer processor the elements in the claim set and the set of synonyms with the technical terms in the database;

determining with the computer processor the set of new elements different from the technical terms;

creating with the natural language processor a set of additional reference numbers for the new elements in the claim set; and adding the set of additional reference numbers and the new elements to the database with the reference numbers and the corresponding technical terms.

14. The method of claim 1 further comprising the steps of:

providing a record of invention document with the claim set and a set of technical terms that are not recited in the claim set;

automatically searching through a computer communications network a set of online resources for the elements recited in the claim set and the set of technical terms;

automatically providing a plurality of hyperlinks to additional information from the set of online resources for the elements and the technical terms;

receiving in the natural language processor at least one of a selection of a set of the hyperlinks to a portion of the additional information from the set of online resources and a copy of the portion of the additional information from the set of online resources, wherein the selection and the copy are received with the elements and the technical terms corresponding to the additional information; and enhancing with the natural language processor the prose associated with the technical terms and the elements according to the portion of the additional information from the set of online resources.

15. A method for automating the preparation of a patent application document for describing an invention, comprising the steps of:

providing a claim set, wherein the claim set recites a plurality of elements in a highly structured format, wherein the claim set is comprised of an independent claim and a plurality of dependent claims, and wherein the highly structured format is comprised of a preamble statement, a set of phrases in which the plurality of elements are recited, a semicolon at the end of at least a first phrase in the set of phrases, and a period at the end of a last phrase in the set of phrases;

determining with a natural language processor each unique element in the plurality of elements, wherein the natural language processor operates on a computer processor;

transforming with the natural language processor the preamble and the set of phrases in the highly structured format into a prose describing the invention in the patent application document; and creating with the natural language processor a plurality of paragraphs in the prose, wherein a first set of the dependent claims depends from a first element in the independent claim, wherein a second set of the dependent claims depends from a second element in the independent claim, wherein the creating step transforms the first set of the dependent claims into a first group of sentences in a first paragraph of the prose, and wherein the creating step transforms the second set of the dependent claims into a second group of sentences in a second paragraph of the prose.

16. The method of claim 15, further comprising the steps of:

providing a drawing set with at least one illustration;

creating a database of the reference numbers uniquely correlated to the elements;

analyzing the illustration with an image processing tool for object recognition;

identifying with the image processing tool a plurality of features of the illustration corresponding with the elements in the database in a set of feature-element pairs; and automatically editing the illustration to annotate the features identified in the illustration with the reference numbers uniquely correlated to the elements.

17. The method of claim 15, further comprising the steps of:

providing a drawing set with at least one illustration;

creating a database of the reference numbers uniquely correlated to the elements;

annotating the illustration with the elements corresponding to a plurality of features in the illustration, wherein the elements are in a text format; and automatically editing the illustration to replace the elements annotated in the text format on the illustration with the reference numbers corresponding to the elements in the database.

18. A method for automating the preparation of a patent application document for describing an invention, comprising the steps of:

providing a claim set, wherein the claim set recites a plurality of elements in a highly structured format, wherein the highly structured format is comprised of a preamble statement, a set of phrases in which the plurality of elements are recited, a semicolon at the end of at least a first phrase in the set of phrases, and a period at the end of a last phrase in the set of phrases;

determining with a natural language processor each unique element in the plurality of elements, wherein the natural language processor operates on a computer processor;

transforming with the natural language processor the preamble and the set of phrases in the highly structured format into a prose describing the invention in the patent application document;

providing a drawing set with at least one illustration;

creating a database of the reference numbers uniquely correlated to the elements;

analyzing the illustration with an image processing tool for object recognition;

identifying with the image processing tool a plurality of features of the illustration corresponding with the elements in the database in a set of feature-element pairs; and automatically editing the illustration to annotate the features identified in the illustration with the reference numbers uniquely correlated to the elements.

19. The method of claim 18, wherein the prose doesn't have the highly structured format of the preamble and the set of phrases and has a less complicated sentence structure than the preamble and the set of phrases.

20. The method of claim 19, further comprising the natural language processor steps of creating a plurality of reference numbers for the plurality of elements in the claim set, uniquely correlating the reference numbers to the elements, adding the reference numbers to the prose in a position adjacent to and following the corresponding elements, and creating a plurality of paragraphs in the prose, wherein the claim set is comprised of an independent claim and a plurality of dependent claims, wherein a first set of the dependent claims depends from a first element in the independent claim, wherein a second set of the dependent claims depends from a second element in the independent claim, wherein a third set of the dependent claims recites a third element that is not in the independent claim, wherein the creating step transforms the first set of the dependent claims into a first group of sentences in a first paragraph of the prose, wherein the creating step transforms the second set of the dependent claims into a second group of sentences in a second paragraph of the prose, and wherein the creating step transforms the third set of the dependent claims into a third group of sentences in a third paragraph of the prose.

* * * * *